(12) United States Patent
Griebe

(10) Patent No.: US 12,307,478 B2
(45) Date of Patent: May 20, 2025

(54) METHOD AND APPARATUS FOR DYNAMICALLY ADJUSTING TO IMPACT OF MEDIA MENTIONS

(71) Applicant: HAHN STATS, LLC, Austin, TX (US)

(72) Inventor: Michael Griebe, Katy, TX (US)

(73) Assignee: Hahn Stats, LLC, Austin, TX (US)

( * ) Notice: Subject to any disclaimer, the term of this patent is extended or adjusted under 35 U.S.C. 154(b) by 11 days.

(21) Appl. No.: 18/352,024

(22) Filed: Jul. 13, 2023

(65) Prior Publication Data

US 2024/0020724 A1    Jan. 18, 2024

Related U.S. Application Data

(60) Provisional application No. 63/388,832, filed on Jul. 13, 2022.

(51) Int. Cl.
*G06Q 30/00* (2023.01)
*G06Q 30/0242* (2023.01)
*G05B 19/418* (2006.01)

(52) U.S. Cl.
CPC .............................. *G06Q 30/0242* (2013.01)

(58) Field of Classification Search
CPC ................. G06Q 30/0242; G06Q 30/0205
See application file for complete search history.

(56) References Cited

U.S. PATENT DOCUMENTS

| 9,406,077 B1* | 8/2016 | Zhao .................. G06Q 30/0247 |
| 2014/0278771 A1* | 9/2014 | Rehman .................... G06N 7/01 |
| | | 705/7.31 |
| 2019/0080246 A1* | 3/2019 | Sun .................... G06Q 30/0201 |
| 2020/0082431 A1* | 3/2020 | Rajasekharan .... G06Q 30/0242 |

OTHER PUBLICATIONS

"Recommendation Systems: An Insight Into Current Development and Future Research Challenges". IEEE. 2022. (Year: 2022).*
"Sentiment Analysis of Public Social Media as a Tool for Health-Related Topics". IEEE. 2022. (Year: 2022).*

* cited by examiner

*Primary Examiner* — Maria V Vanderhorst
(74) *Attorney, Agent, or Firm* — Fish & Richardson P.C.

(57) ABSTRACT

In some implementations, adjusting entity activities in response to media mentions can include actions of detecting media mentions, calculating the effect of media mentions using a mixed effect model, and generating recommendations using a machine-learning model to adjust a predicted outcome of the entity activity. The prediction of effects can include data processing using a mixed model comprising a statistical model containing both fixed effects and random effects. The dynamic adjustment can be based on recommendations provided using a machine-learning model. The recommendations can include a dimensional projection matrix including a spatial and temporal dimension.

20 Claims, 7 Drawing Sheets

METHOD AND APPARATUS FOR DYNAMICALLY ADJUSTING TO IMPACT OF MEDIA MENTIONS

CROSS-REFERENCE TO RELATED APPLICATIONS

This application claims the benefit of U.S. Provisional Application No. 63/388,832, filed Jul. 13, 2022, the contents of which are incorporated by reference herein.

TECHNICAL FIELD

The present specification relates to the field of computer applications, and in particular, to a method and apparatus for dynamically estimating the impact of earned media using a mixed effect model and an electronic device.

BACKGROUND

With the rapid development of communication technologies, networking and transparency of review, analysis of data related to goods and services has become an increasingly important. With millions of multimedia reviews being released to potential consumers, the ability for consumers to quickly access various forms of review is affecting the planned consumption. Some review platforms providing the users with Internet services can collect massive review data that can have an immediate effect as well as a long-term effect on the respective goods and services. The review data provides very valuable "resources" for good and service providers that can be used to improve future consumption.

SUMMARY

The present specification provides a method for collection of earned media mentions using formulaic queries to predict corresponding effects and to dynamically adjust future earned media efforts.

Optionally, the collection of earned media mentions includes collection of daily and geographic impact data. The prediction of effects can include data processing using a mixed model comprising a statistical model containing both fixed effects and random effects. The dynamic adjustment can be based on recommendations provided using a machine-learning model. The recommendations can include a dimensional projection matrix including a spatial and temporal dimension. Optionally, the apparatus further includes the following: a storage module, configured to locally store the projection matrix. Optionally, the apparatus further includes the following: an update module, configured to: if the data features change in terms of a dimension, or meanings represented by the data features change, perform calculation on a target good or service provider, and update the locally stored projection matrix based on the recalculated projection matrix.

The present specification further provides a method for training a machine-learning model, and the method includes the following: receiving a recommendation matrix transmitted by a data provider server and training a machine-learning model by using feedback data from one or more target good or service provider.

In some instances, the method, medium and system include generating a media experiment dataset by identifying a category of media mentions to analyze, performing a standardized query of a plurality of media sources for results associated with media mentions in the identified category, performing a validity assessment of the results, associating each result with geographic reach information, and adding each result as a new media experiment to a historical dataset that includes previously acquired media experiments from the standardized query to generate the media experiment dataset. Impact data can be generated by identifying an impact variable to be analyzed, retrieving performance data associated with the impact variable that is associated with a date, time, and geographic region, and querying the performance data for a period that includes the media experiment and for each media experiment in the media experiment dataset to generate impact data. The media experiment dataset and the impact data can be used to generate a mixed model. The mixed model can be used to determine, for at least one media experiment in the media experiment dataset, a return associated with the at least one media experiment.

Implementations can optionally include one or more of the following features.

In some instances, the standardized query includes one or more root words, one or more synonyms, and a target. The root words and synonyms are not changed between queries.

In some instances, the validity assessment includes classifying each result based on whether the media mention associated with the result was a paid advertisement, and if so, determining that the result is invalid.

In some instances, the impact variable includes at least one of quantity of sales, quantity of customers, or number of transactions.

In some instances, the period including the media experiment includes performance data from six hours prior to, and six hours following the media experiment. In some implementations, the period is limited to the period between six hours prior to, and six hour following the media experiment.

In some instances, the return is a numerical score associated with an estimated efficacy of the at least one media experiment.

In some instances, the mixed model is provided as input to a machine learning algorithm configured to determine insights associated with the media mentions and the performance data. The machine learning algorithm can include a random forest algorithm, and insights can include estimated market saturation levels, a score associated with the identified category of media mentions, and predicted future efficacy of the identified category of media mentions.

The subject matter described in this specification can be implemented so as to realize one or more of the following advantages. First, data collection is a fully automated process that can be completed in real time without delays due to secondary user inputs. For example, users can adjust the detection rules that collect and aggregate data prior to data processing. Second, data processing is optimized by selecting rules, corresponding to an entity type, a location and one or more other parameters. Third, the recommendations are optimized by using a machine-learning technique that is continuously updated to increase data recommendation accuracy.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DESCRIPTION OF IMPLEMENTATIONS

In a multi-platform connectivity era, various types of media mentions can be detected using multiple sensors. Different media mentions have different impacts on different groups of people, but an effect on a particular target entity (good and/or service provider) can vary based on multiple factors. A solution to estimating the effect of media mentions can include a calculation using a mixed effect model, the outcome of which can be processed using a machine-learning model to generate recommendations that improve a predicted outcome of the entity.

Figure 1:
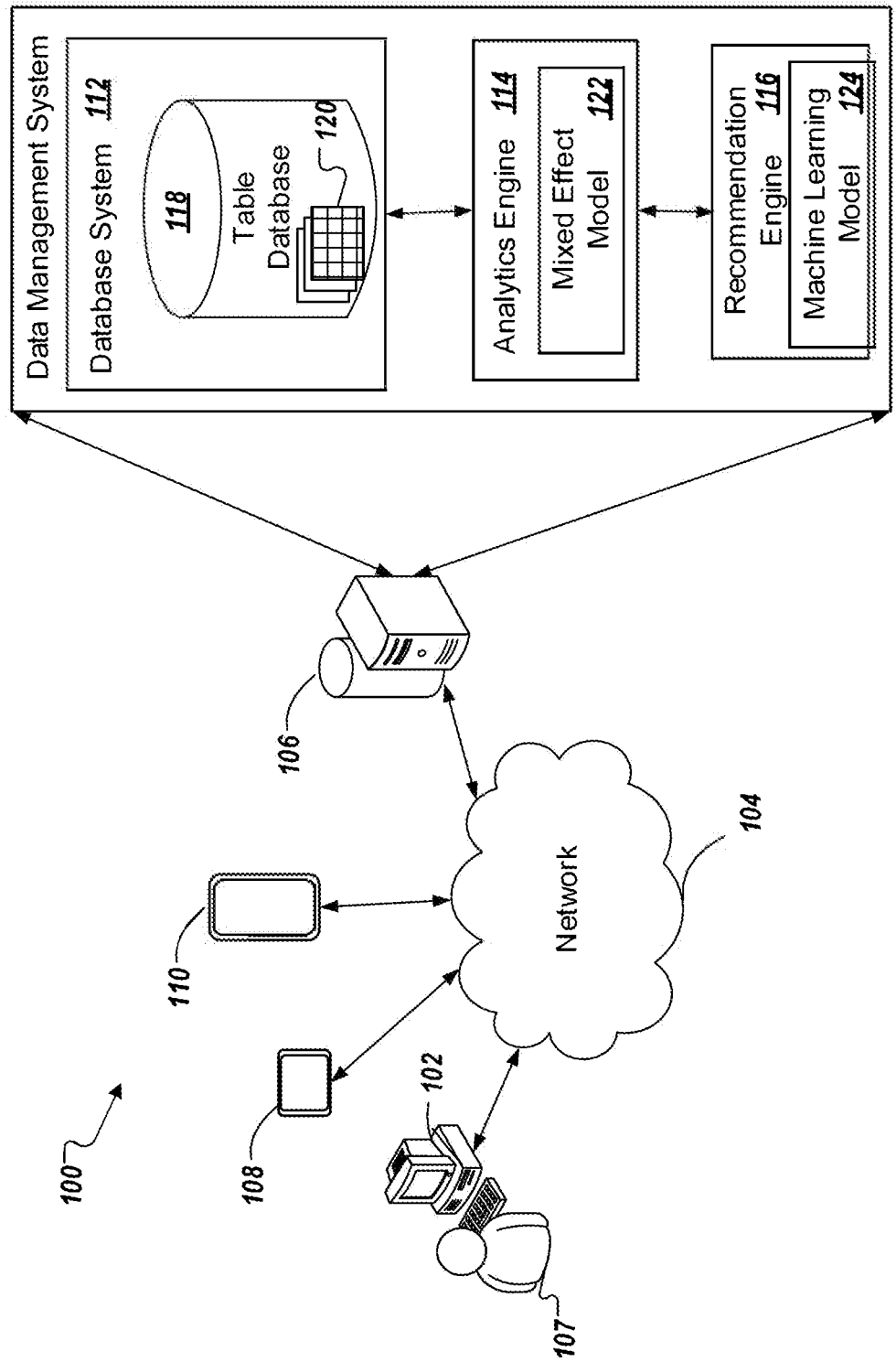
FIG. 1 is a schematic illustration of an example system architecture in accordance with implementations of the present disclosure.

Referring now to FIG. 1, an example system architecture 100 is illustrated for generating recommendations based on media mentions. The example system architecture 100 includes a user device 102, a network 104, data management system 106, a first media sensor 108, and a second media sensor 110. As discussed in further detail herein, a user 107 can enter a user input on the user device 102 to request and/or define detection conditions for media mentions for a particular entity to be processed using the data management system 106. The user input can be transmitted by the user device 102 through the network 104 to the data management system 106, which can control the media sensors 108, 110 to activate detection of media mentions. The data management system 106 can process the media mentions detected by the media sensors 108, 110 and transmit the recommendations through the network 104 to the user device 102 for presentation or display on the user device 102 or on any other user device connected to data management system 106. Although a single user device 102 is illustrated, it is contemplated that, in some implementations, one or more user devices 102 (each corresponding to a particular entity) can communicate with the data management system 106 through the network 104.

The user device 102 can include any number of example devices including, but not limited to, a mobile phone, a smartphone, a tablet computing device, a personal digital assistant (PDA), a laptop personal computer (PC), a desktop PC, and/or appropriate combinations thereof. In the depicted example, the user device 102 includes a display, a processor, a memory, an input interface, and a communication interface. The processor can process instructions for execution of implementations of the present disclosure. The instructions can include, but are not limited to, instructions stored in the memory to display graphical information on the display. Example displays include, but are not limited to, a thin-film-transistor (TFT) liquid crystal display (LCD), or an organic light emitting diode (OLED) display. The memory stores information within the user device 102. In some implementations, the memory can include a volatile memory unit or units, and/or a non-volatile memory unit or units. In other implementations, removable memory can be provided, and can include, but is not limited to, a memory card. Example memory cards can include, but are not limited to, a secure digital (SD) memory card, a mini-SD memory card, a USB stick, and the like. In some implementations, the input interface can include a keyboard, a touchscreen, a mouse, a trackball, a microphone, a touchpad, and/or appropriate combinations thereof. In some implementations, an audio codec (not shown) can be provided, which receives audible input from a user 107 or other source through a microphone, and converts the audible input to usable digital information. The audio codec can generate audible sound, such as through a speaker that is provided with the user device 102. Example sounds can include sound from voice telephone calls, recorded sound (e.g., voice messages, music files, etc.), and/or sound generated by applications operating on the user device 102.

The user device 102 can communicate with the network 104 through a connectivity interface(s). In some implementations, the connectivity interface(s) can include a satellite receiver, cellular network, a Bluetooth system, a Wi-Fi system (e.g., 802.x), a cable modem, a DSL/dial-up interface, a private branch exchange (PBX) system, and/or appropriate combinations thereof. Each of these connectivity interfaces enables data to be transmitted to/from the network 104. In some implementations, the network 104 can be provided as a local area network (LAN), a wide area network (WAN), a wireless LAN (WLAN), a metropolitan area network (MAN), a personal area network (PAN), the Internet, and/or combinations thereof. In some implementations, other connectivity interface or network types as understood by one of ordinary skill in the art can be used.

The sensors 108, 110 can be sensors configured to detect media mentions provided by any type of communication media systems that can participate in providing entity reviews using various types of media such as live or published information provided as voice, video, text, location, rating selection (e.g., star rating or binary rating), and other data. The sensors can be configured to detect media mentions within a time interval, for a geographical location or can be unlimited, continuously detecting the media mentions associated to one or more entities identified in a user input received by the user device 102.

In some implementations, sensors 108, 110 are devices configured to perform structured or formulaic queries. These structured queries can be targeted at multiple services or platforms which return one or more sets of results to the sensors 108, 110. For example, sensors 108, 110 can query crawling services such as Meltwater, Signal-AI, Google News Search, or SproutSocial. In general, the sensors 108 and 110 can be cloud-based services that scan media mentions by collecting transcriptions for large numbers of broadcasts and/or podcasts. The structured query can follow a predetermined formula, which is consistently used over time to allow comparisons of queries before and after a particular media mention. For example, the structured query can include one or more root words or phrases, and synonyms which are maintained from query to query, and a target word or phrase that is treated as the query variable.

The data management system 106 can include, but is not limited to, a server system, a procurement system, an asset intelligence system, an enterprise resource planning system, a logistics system, a manufacturing system, and an asset service system. In the example system architecture 100 implementation of FIG. 1, the data management system 106 includes a database system 112, an analytics engine 114, and a recommendation engine 116.

In the illustrated implementation, the database system 112 includes a table database 118 configured to store one or more tables 120. The tables 120 can include a plurality of rows (or records) and a plurality of columns (or attributes or fields). In some implementations, based on analyzing records for one or more of the tables 120, the effects of the media mention parameters can be determined. The database system 112 can be, for example, a PostgreSQL system, or a file/index system, among other database organizational architectures.

In some implementations, the effects can be determined using a mixed effect model 122 configured to communicate with database system 112. Examples of mixed effect models 122 include one or a combination of statistical models containing both fixed effects and random effects. The mixed effect models 122 can be configured to process complete tables or incomplete tables 120 that could have one or more missing values.

In some implementations, the analytics engine 114 can be configured to retrieve additional data to complete missing values of the tables 120 that can be imported from a repository or provided by another detection or analysis process.

In some implementations, the analytics engine 114 can be configured to transmit the determined effects to the user device 102 to be displayed and to the recommendation engine 116 to generate one or more recommendations using a machine-learning model 124. The machine-learning model 124 can be configured to process the estimated effects relative to a function of the entity (e.g., sale of a good or offer of a service) and one or more adjustable parameters (e.g., capacity limit of service or good sale) to generate a corresponding recommendation. All or a portion of the entity adjustable parameters can be automatically selected for generating the recommendations.

The recommendation engine 116 can be configured to process data from multiple entities that cooperate with each other to share data to train the machine-learning model and increase the accuracy of the recommendations. In some implementations, the shared data is encrypted by the user device 102 for privacy protection before being transmitted to the data management system 106. For example, an encrypted matrix is transmitted to the data management system 106 as a training sample. After receiving the encrypted matrix, the data management system 106 can train the machine-learning model 124 by using the encrypted matrix as the training sample. For example, the recommendation engine 116 can combine the encrypted matrix with a local training sample retrieved from the database system 112, and then train the machine-learning model 124 based on a combined training sample. After the encrypted matrix encrypted based on a selected encryption algorithm is transmitted to the recommendation engine 116, the recommendation engine 116 usually cannot restore an original media mention matrix based on the encrypted matrix, so that private data of an entity can be protected to the greatest extent, thereby alleviating privacy disclosure of the entity caused in a process of submitting a data sample to the modeling server for model training.

Figure 2:
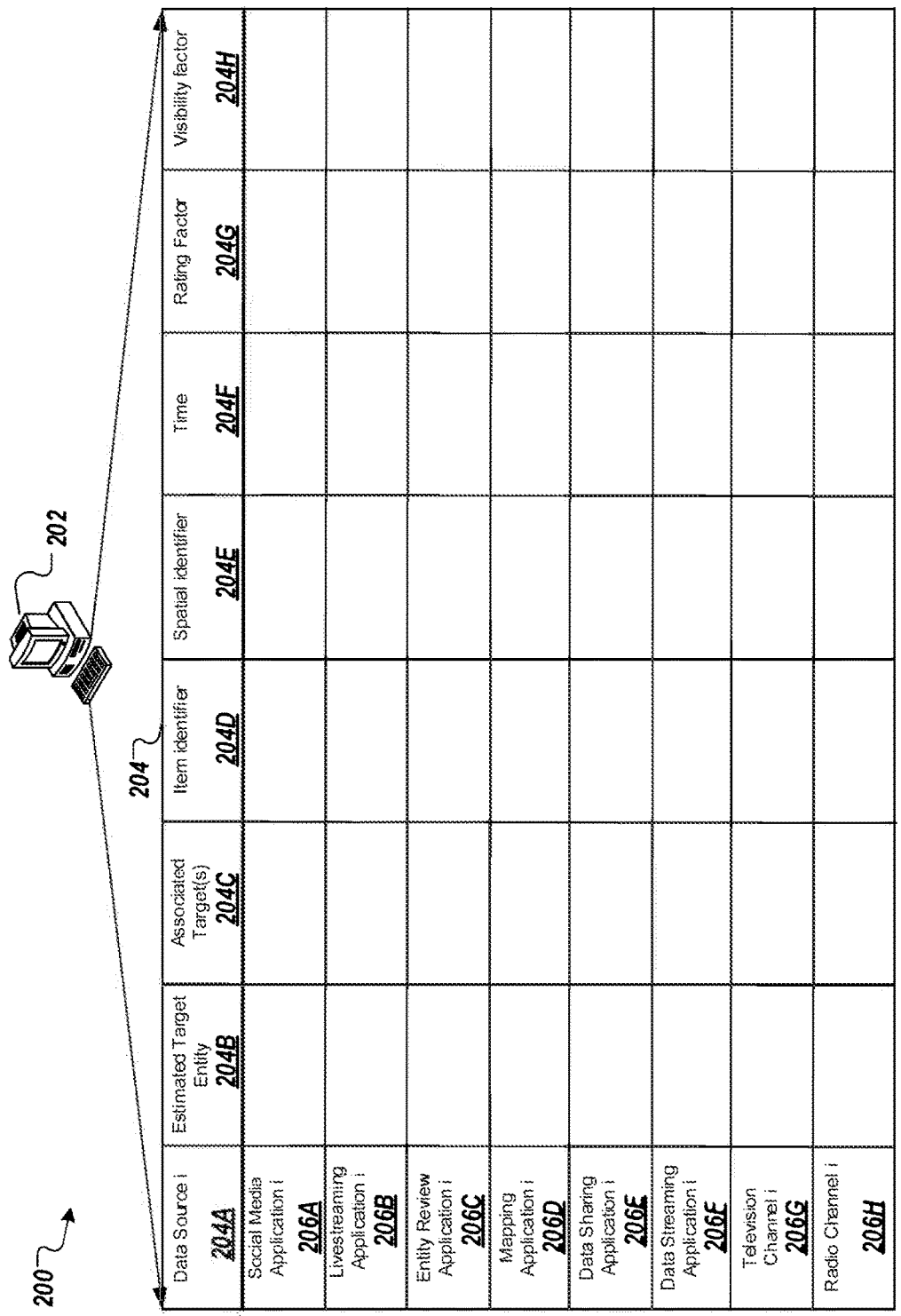
FIG. 2 is a schematic diagram illustrating an example of collected data matrix, according to an implementation of the present specification.

Referring to FIG. 2, an example of a media mention matrix 204 including media mentions collected from multiple media types that correspond to rows of the media mention matrix is illustrated. The media mention matrix 204 can be represented in a form shown in FIG. 2 or can be formatted as a multidimensional matrix. In the media mention matrix shown in FIG. 2, each column represents one media mention parameter and each row represents a media source. The media mention parameter can include an identifier of an estimated target entity 204B, associated target(s) 204C, item identifier 204D, spatial identifier 204E (region with corresponding spatial range), time 204F (broadcasting time, duration of broadcast, published time, etc.), rating factor 204G, and visibility factor 204H (estimated audience, estimated number of users, viewers, and/or listeners). The media source can include a social media application 206A, a livestreaming application 206B (streamed through internet), an entity review application 206C, a mapping application 206D, a data sharing application 206E, a data streaming application 206F, a television channel 206G, a radio channel 206H, and any other type of media source that enables entity reviews.

In some implementations, data is collected by sensors during a set time period to complete a minimum number of entries before being transmitted to the data management system to be processed. After generating the N×M dimensional media mention matrix based on the N data sources and the M dimensional data features respectively corresponding to the N data samples, the data management system can perform an effect estimation for the estimated target entity (e.g., entity located within the detected region) and for associated target entities (e.g., one or more other entities that provide similar goods and services outside the detected region).

Figure 3:
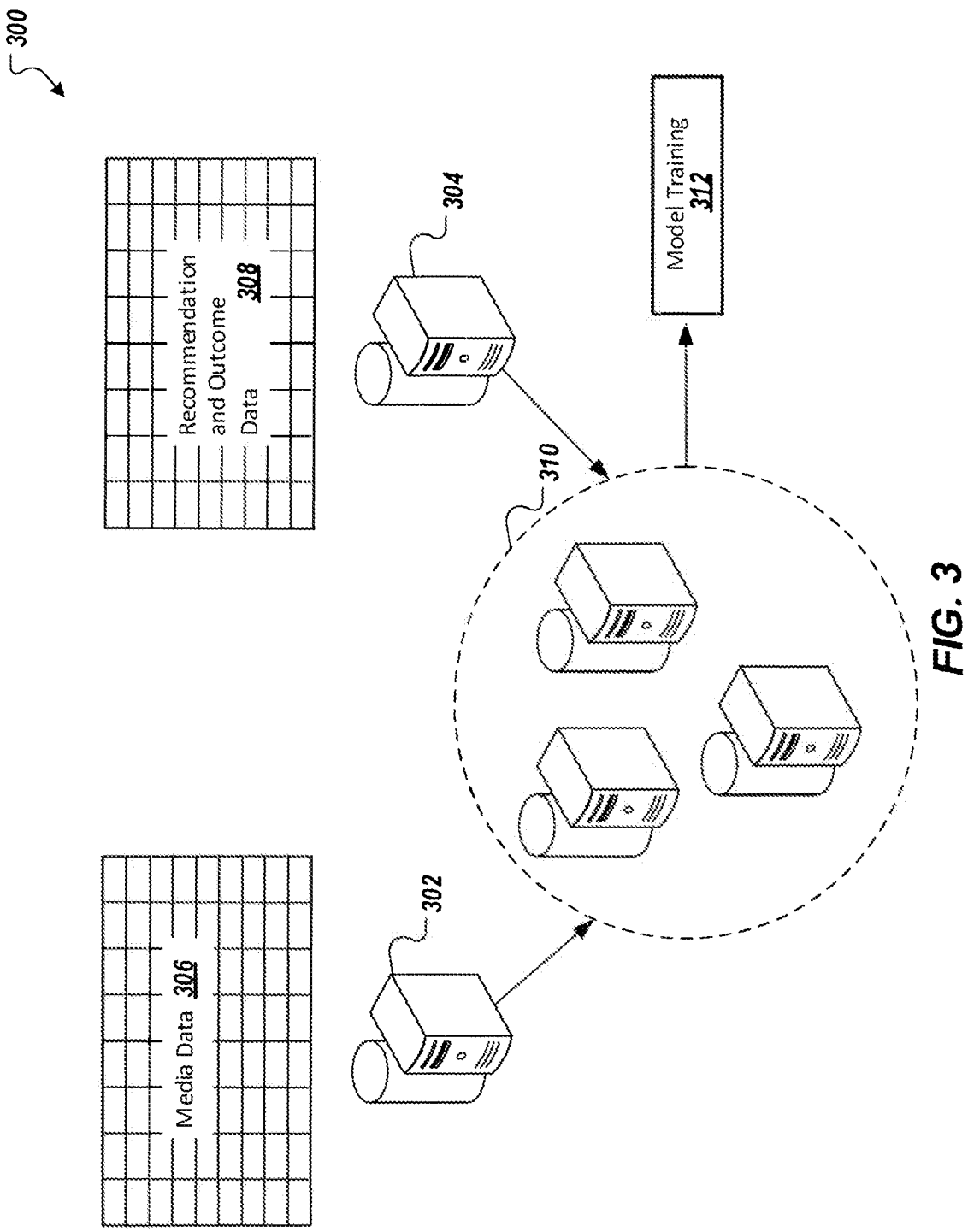
FIG. 3 is a schematic diagram illustrating joint modeling performed by combining a plurality of data samples, according to an implementation of the present specification.

FIG. 3 a schematic diagram illustrating modeling performed by combining a plurality of data samples, according to the present specification.

The data management system 310 can be the data management system 106, described with reference to FIG. 1. The data management system 310 can include a data operation platform of an entity. The data management system 310 can receive media data 306 from a data provider server 302 connected to one or more sensors and a data provider server 304 that stores recommendation and outcome data 308. In practice, the data management system 310 can be a non-credited third party for the data provider servers 302, 304. The data management system 310 can directly provide retrieved media data 306 and past recommendation and outcome data 308 for data modeling 312. The data management system 310 can perform, based on an encryption algorithm encryption calculation of the past recommendation and outcome data 308 for data modeling 312, to obtain an encrypted matrix, and then transmit the encrypted matrix to the machine-learning model, as a training sample. The data management system 310 can combine a received training sample provided by the data provider server with a localized data sample, and then train the machine-learning model based on a combined training sample, for example, combine entity transaction data with localized associated entity transaction data in the data operation platform to jointly train a recommendation model for dynamically adjusting an entity strategy based on an estimated effect to detected media mentions.

It is worthwhile to note that a specific type of the machine-learning model is not particularly limited in the present specification. For example, in practice, the machine-learning model can be a supervised prediction model established based on a supervised machine-learning algorithm (such as a regression algorithm), for example, a recommendation model that is used to prepare for an estimated effect (increased or decreased demand of a good or a service); or can be an unsupervised classification model established based on an unsupervised machine-learning algorithm (for example, a k-means algorithm), for example, a recommendation model that is used to deliver a suggested strategy in response to an advertisement or page content associated to the entity and that is trained based on a click and access data of the user.

After the machine-learning model is trained by using the previously described modeling methods, the data provider server can still subsequently encrypt, based on the projection matrix, a data matrix constructed based on a collected data sample and a related data feature, and then transmit the data matrix to the machine-learning model for calculation, to obtain an output result of the model. For example, the machine-learning model is the recommendation model that is used to generate an action in response to an estimated effect formatted as a projection matrix defining an estimated demand for an entity item (good or service) over a period of time. Based on the projection matrix, the data management system 310 can perform model training 312 and then transmit the recommendation data for a corresponding entity.

Figure 4:
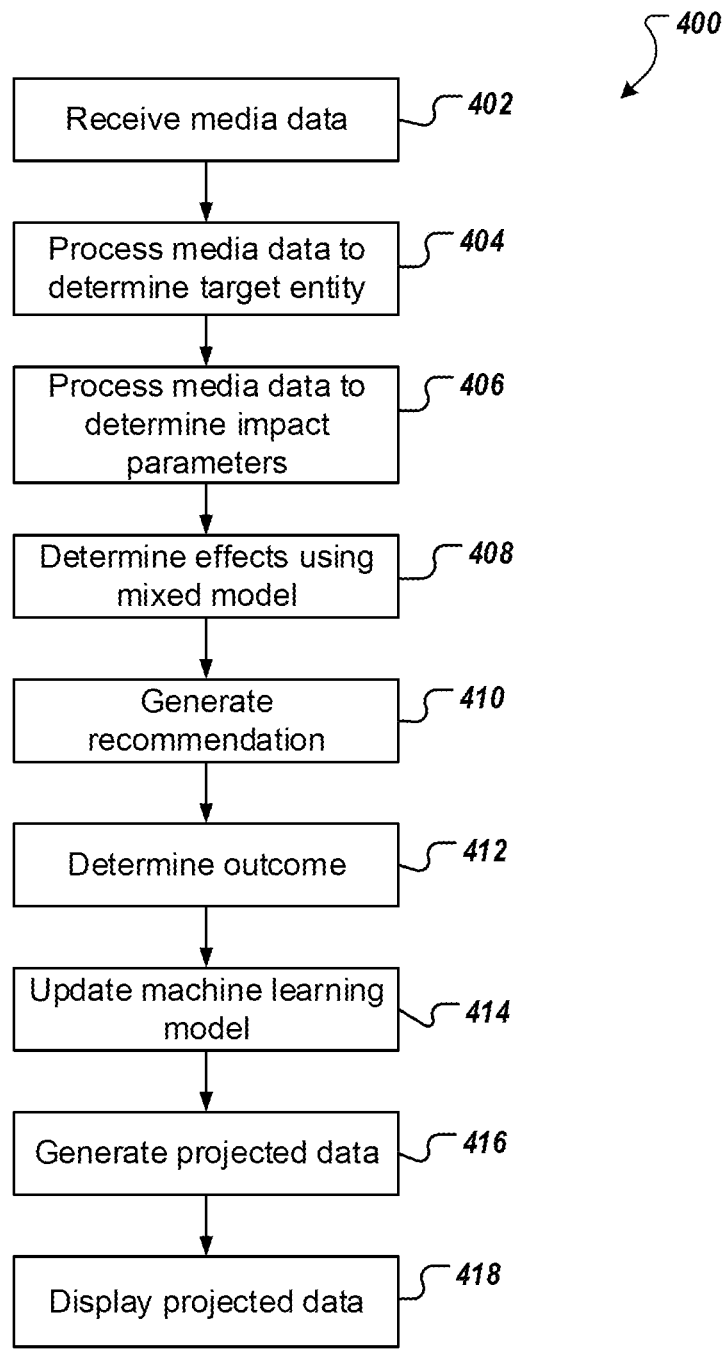
FIG. 4 depicts an example process in accordance with implementations of the present disclosure.

FIG. 4 depicts an example process in accordance with implementations of the present disclosure. In some implementations, the example process 400 can be provided by one or more computer-executable programs that are executed by one or more computing devices. In some implementations, the example process 400 can be provided as part of a media mention analysis tool. In some implementations, the media mention analysis can be provided in a client-server architecture. For example, user interfaces can be provided on one or more client computing devices for receiving user input. The user input can be transmitted to one or more sensors to trigger detection of media data and server devices, which can process the media data as discussed herein.

Media data is received from one or more sensors (402). The media data can include media mentions of a good or a service provided by an entity. The media data can include results of ad hoc searches and detection results generated by activated sensors during a set time period with a set frequency (hourly or daily). The media mentions can include graded rating or binary (positive or negative) rating of the good or the service provided by the entity that is broadcasted live or was published by a media source. The media data can be formatted as a matrix (table).

The media data is processed to determine target entity (404). In some implementations, the media mentions can be processed to extract the entity name based on an entity identifier or keywords associated with the entity (e.g., entity type and/or address of the entity).

The media data is processed to determine impact parameters (406). The impact parameters associated with the entity can include a derivation of the visibility of the media mention for a population within a given region relative to the interest of the population for the goods or services provided by the entity.

The impact parameters are processed to determine media mention effects (408). The impact parameters can be processed using a mixed effect model, an auto-regression model (based on a compression between what happened during a first time interval and a second time interval relative to a detected change associated with the media mention), or any other statistical model configured to generate estimates of immediate and long-term effects on the entity activity based on the media data. The effect estimates can include increased or decreased demands for the given good and/or service provided by the entity.

The estimated effects are used to generate a recommendation for the respective entity (410). The estimated effects and one or more entity parameters can be modeled using a machine-learning model to generate the recommendation for the respective entity. The recommendation can include a suggestion to plan for increased demand during a given time interval for a particular good and/or service that were mentioned by the media, as detected by the sensors and recorded in the media data. The recommendation can be displayed as an alert on a user device of a user (entity manager) and can be stored in a database in association with the media data and estimated effect.

After a set period of time, the outcome can be determined (412). In some implementations, the set period of time can be equal or longer than the estimated duration of the effect, for which the recommendation was provided. The outcome recording can include the response of the population to the media mentions relative to the estimated response and the response of the entity to the provided recommendation.

The recorded outcome can be transmitted to the machine-learning model to be used as training and to update one or more parameters of the machine-learning model to increase the accuracy of future recommendations (414). In some implementations, historical data can be used to generate projected data (416), which can form the basis of long-term plans for the entity. The projected data can be displayed as an alert on a user device of a user (entity manager) and can be shared with associated entities for global planning.

Figure 5:
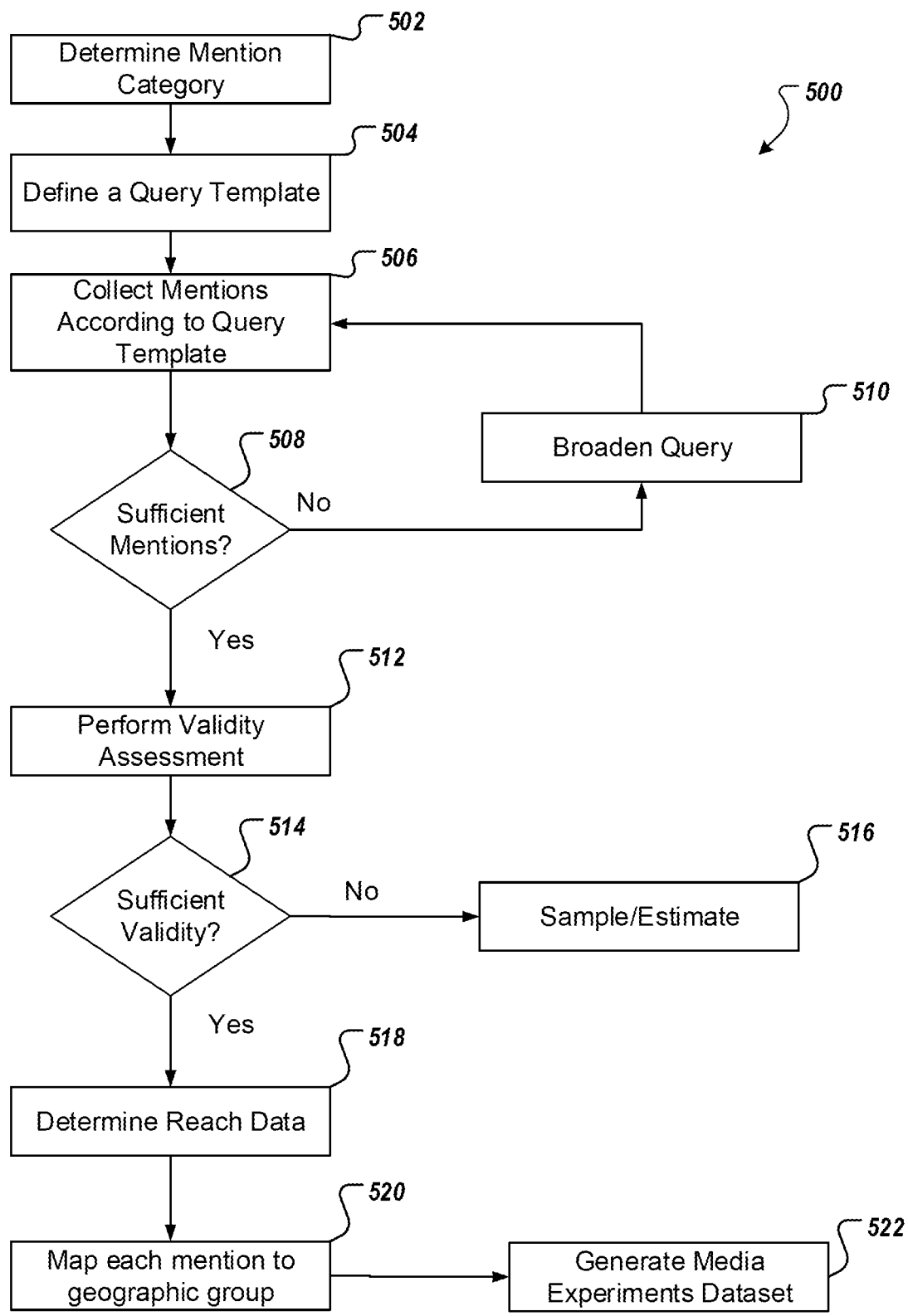
FIG. 5 illustrates an example process for generating a media experiments dataset.

FIG. 5 illustrates an example process for generating a media experiments dataset. In some implementations, example process 500 can be provided by one or more computer-executable programs that are executed by one or more computing devices. In some implementations, the example process 500 can be provided as part of a media mention analysis tool. In some implementations, the media mention analysis can be provided in a client-server architecture. For example, user interfaces can be provided on one or more client computing devices for receiving user input. The user input can be transmitted to one or more sensors to trigger detection of media data and server devices, which can process the media data as discussed herein.

A media mention category is initially determined (502) in order to identify the specific term or terms that are to be analyzed for impact. Mention categories can include, for example, particular products or types of products, particular competitors, specific issues or conversational topics, or mediums and platforms. Once a media mention category is determined, a structured query or query template can be defined.

Defining the query template (504) can include selected a number of key words (and synonyms) to include in the query, as well as a target entity. In some implementations, the query template is pulled from a repository of previous queries. In this manner, the query can contain the same search terms as previous queries and yield consistent results, allowing an accurate representation of media mentions over time. In other words, by using a standardized query template, each media mention returned by the query can be treated as a separate experiment and compared to other mentions, since each mention will yield a set of results from the same query template.

In some implementations, the query template is of the form [KeyWord A|Synonyms]×[KeyWord B Synonyms]×[Target]×[Filter(s)]. For example, a query might include: [Brand Synonyms]×[Product synonyms]×["Inflation"]×[Not Paid Ad]. This query will return results relating to a particular product of a particular brand that were mentioned in the context of inflation and not the result of a paid advertisement. Another query, using the same template could change the target term from "Inflation" to "Election" and yield another set of results (or experiments) using the same query template.

The defined query template is then used to collect media mentions (506) from various platforms. In some implementations, the query template, with a selected target term is used to generate a query, which is passed to one or more services for monitoring media exposure (e.g., Meltwater, Signal-AI, Google News Search, SproutSocial, or other service). The query results can be collected as a number of media mentions, each mention can be associated with certain standardized information such as time, geographic location, spatial reach, visibility (e.g., number of views), etc. Optionally, process 500 can check to ensure a sufficient number of results or mentions is returned (508). In some examples, a predetermined number of mentions (e.g., 100, 20, 1000, or other suitable number) is necessary to perform further analysis, and if less than that required amount is returned, the query is broadened (510). In some implementations, broadening the query includes altering the target word or phrase, or adding additional target words/phrases to the defined query template.

If sufficient mentions have been received, additional validity assessment (512) can be performed. For example, the returns can be analyzed for relevance, with irrelevant or unrelated (e.g., erroneous) search results being discarded. In some implementations, the validity assessment includes performing a random sample of a subset of the collected mentions and performing an analysis on the subset to characterize the entirety of the collected mentions (516). For example, where paid media mentions are to be filtered, a subset of 100 results can be drawn from a data set of 10,000 results. The subset of 100 results can be analyzed (e.g., manually by a user, or automatically using a machine learning algorithm) for results that include paid media mentions. If, for example, 35 mentions in the subset result from paid mentions, then it can be assumed that 35% of the 10,000 results are paid mentions.

In some implementations, validity assessment includes categorization and classification of the collected results. For example, the collected results can be classified as "positive," "negative," or "neutral". Similarly to the sample and stratify method described above, in some implementations, the results are classified based on analysis of a smaller subset of the entirety of the collected results. For example, if a set of 1,000 'negative' mentions are needed to conduct an analysis, each mention can be analyzed (e.g. manually or by algorithm) for 'negative' brand association and classified as 'negative'.

Reach data can be determined for the collected results (518) from the media platforms the results were acquired. For example, a particular news platform may publish typical viewership, or even actual views, for a particular segment or mention. Additionally, geographic information can be used to estimate the effective reach of a particular mention. For example a regional broadcast can be assumed to reach the area in which the broadcast is live and have less reach nationally.

Each mention in the collected dataset is mapped to a geographic group or region (520). This can correlate with groups of stores or locations, and can be used to compare the effect of a particular media mention while using locations outside of the geographic group as a "control" for that mention.

A media experiments dataset is generated (522) combining the collected results from the queries generated based on the query template, validity assessments, categorization and classification, reach data, and geographic group data. In some implementations, each media mention is an experiment in the media experiments dataset. In some implementations the media experiments dataset is similar to a completed table database as illustrated with respect to FIG. 2. The media experiments dataset includes a number of specific media mentions, each associated with a geographic region, estimated reach, time, classification, and other information. Additionally, in some implementations, the media experiments dataset includes metadata describing the experiments as a whole (e.g., estimated demographics, amount of paid mentions, total activity by date, etc.).

Figure 6:
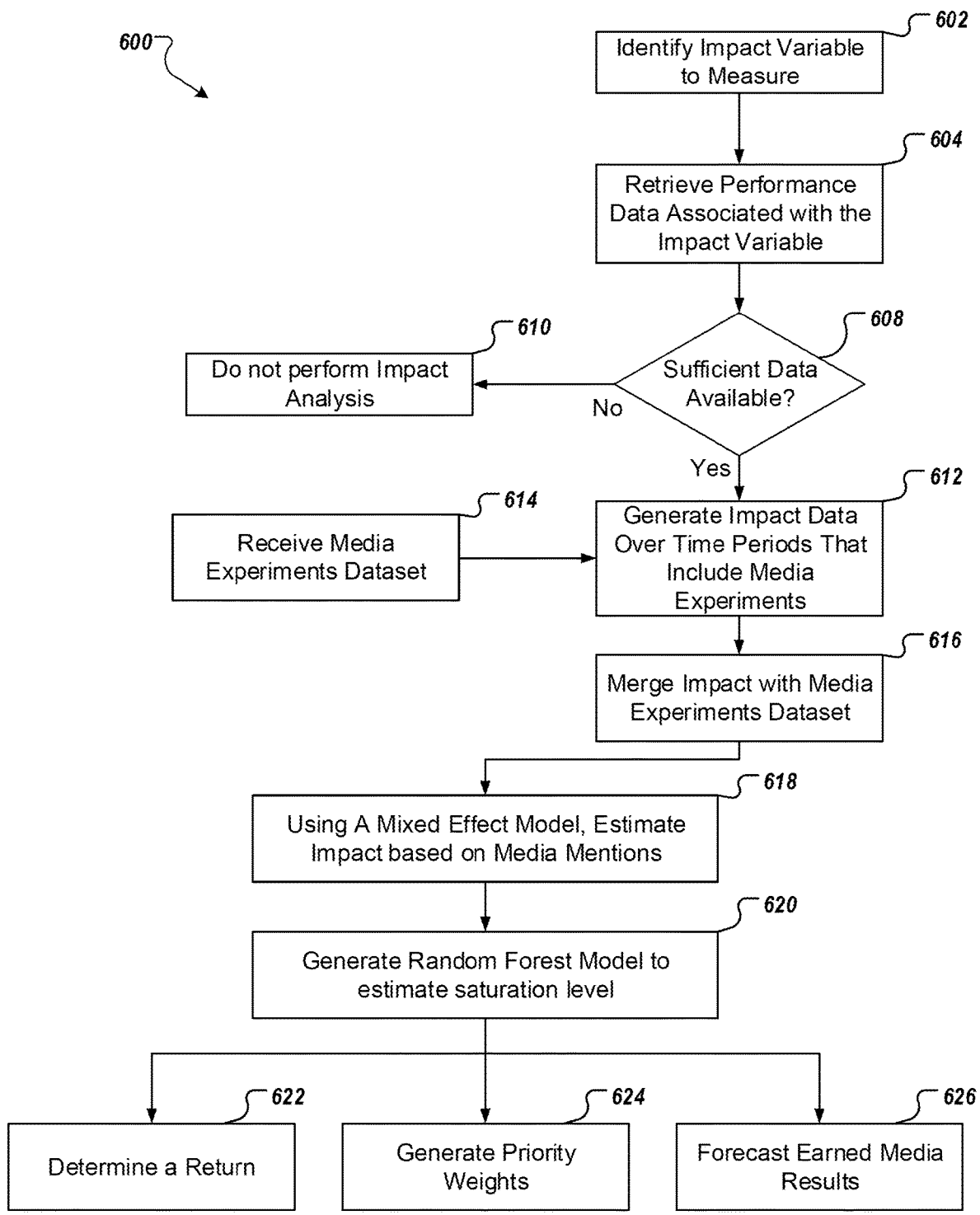
FIG. 6 illustrates an example process for generating a return from impact data and a media experiments dataset.

FIG. 6 illustrates an example process for generating a return from impact data and a media experiments dataset. In some implementations, example process 600 can be provided by one or more computer-executable programs that are executed by one or more computing devices. In some implementations, the example process 600 can be provided as part of a media mention analysis tool. In some implementations, the media mention analysis can be provided in a client-server architecture. For example, user interfaces can be provided on one or more client computing devices for receiving user input. The user input can be transmitted to one or more sensors to trigger detection of media data and server devices, which can process the media data as discussed herein.

Process 600 begins with selecting an impact variable to analyze (602). The impact variable can be, for example, sales, customer volume, transactions, profit, click-through, or other suitable parameter. Once the variable to be analyzed is selected, performance data associated with that impact variable is retrieved (604). Performance data can include, e.g., sales data, profitability data, or other data. In some instances, performance data is specific to a particular entity being analyzed. For example, the performance data can be for a particular branch of a franchise of stores, or a particular website or geographic region of a website. In some instances, the performance data contains sensitive business data and is encrypted, or otherwise secured to prevent unauthorized access. In some implementations, the performance data is sanitized, removing personally identifiable information or private information, prior to processing.

A determination is made whether sufficient performance data is available for analysis of the impact variable (608). In some implementations, in order for process 600 to provide suitable results, the performance data must have a daily time period or less (e.g., hourly), it must include multiple geographic regions or markets, and there must be at least one year of historical data present. In some implementations, these requirements can be more or less stringent, depending on the analysis performed and the required confidence in the results.

If sufficient performance data is available, then an impact dataset can be generated which includes performance data for time periods that include the mentions or media experiments from a media experiments dataset (612). In some implementations, the media experiments dataset is generated similarly to the process described in reference to FIG. 5. Each mention (e.g., experiment) in the media experiments dataset can be associated with performance data to generate an impact dataset. In some implementations, the impact dataset includes performance data for a time period surrounding each media mention. For example, the impact dataset can include performance data for 24 hours prior to and 24 hours following each media mention. In some implementations, the impact dataset includes continuous or near continuous performance data (e.g., number of transaction per minute) surrounding each media mention. This impact dataset is merged with the media experiments dataset (616) in order to further analyze.

The merged media experiments dataset and impact dataset are analyzed using a mixed effects model to estimate an impact (618) of media mentions. The mixed model includes two or more dimensions (e.g., a performance dimension, such as sales, and a mention dimension, such as views) and notes that observations include random effects and fixed effects. Mixed models can be particularly useful in this solution where there are multiple, repeated experiments (e.g., using a structured query) and the effect (e.g., impact) is relatively noisy. Additionally, a mixed model is robust to potential missing data points (e.g., mentions that were not captured by the queries). For a given merged dataset including the media experiments dataset and the impact dataset, the mixed model can generate an estimated return (e.g., impact score) for each media mention or experiment in the media experiments dataset. In some implementations, where the media mentions are classified or categorized, the mixed model can provide a more general result. For example, the mixed model can provide a relative impact score for cable broadcast mentions compared to streaming service mentions. The outputs of the mixed effect model include weights for each of the variables of interest and the errors for each mention. These weights can be used to determine the expected impact of any observed media mention. The errors show how each media mention over or under performed its expectation.

Further analysis of the merged media experiments dataset and impact dataset can be performed using a machine learning algorithm (620). For example, a random forest model can be trained to classify media mentions and provide a relative impact. This relative impact output can be similar to or different from the impact derived by the mixed model. Additionally, in some implementations, a machine learning algorithm can ingest the output of the mixed model to provide further insights. In some implementations, a random forest model can estimate a relative market saturation for a particular product or offer in a specific region, based on media mentions (622). In some implementations, the machine learning model is trained on a combination of supervised and unsupervised methods. For example the machine learning model can be trained using a random forest model and a k-means clustering model. In some implementations, the random forest model generates relative priority weights (624) indicating a relative importance of each particular mention in one or more dimensions (e.g., reach, sales impact, reputation impact, etc.). These relative importance, or weights, can be uses to prioritize future media efforts. These weights are different from the mixed effect model because they can be combined to create non-linear representation of the impact of a media mention. That is, the impact of the media mention can vary based the reach of the mention in a non-linear way. The tapering of the impact of reach is indicative of the extent of market saturation.

In some implementations, the machine learning algorithm can be used to forecast future media mention results (626). For example, the random forest model can be used to predict a likely impact of a news anchor mentioning a particular product for a particular region. Similarly, the random forest model could estimate the geographic regions where the impact will be greatest in response to a particular mention on a national news network. It should be noted that the present disclosure is not limited to a random forest model, but any suitable machine learning algorithm for analyzing the datasets and providing inferences from them.

Figure 7:
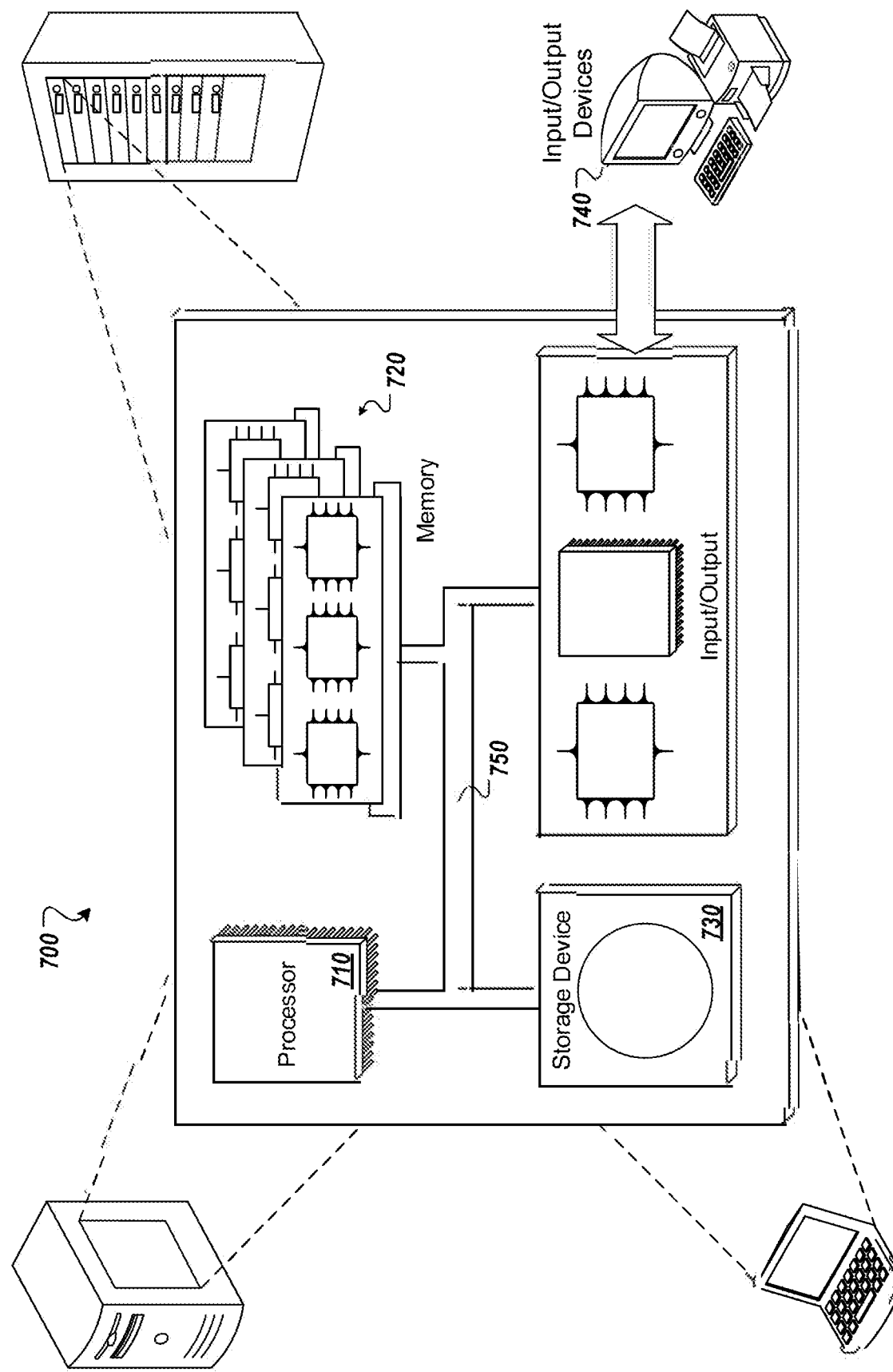
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor, for displaying information to the user and a keyboard, and a pointing device, such as a mouse or a trackball, by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order or sequential order shown, to achieve desirable results. In addition, other steps may be provided or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer implemented method comprising:
   generating a media experiment dataset by:
      identifying, at a data management system controlling one or more media sensors, a category of media mentions to analyze;
      performing, by the one or more media sensors, a standardized query of a plurality of media sources for results associated with media mentions in the identified category;
      performing, by the data management system, a validity assessment of the results;
      associating, by the data management system, each result with geographic reach information; and
      adding, by the data management system, each result as a new media experiment to a historical dataset comprising previously acquired media experiments from the standardized query to generate the media experiment dataset;
      storing the media experiment dataset as structured data in the data management system;
   generating impact data by:
      identifying an impact variable to be analyzed;
      retrieving performance data associated with the impact variable, wherein the performance data is associated with date, time, and a geographic region; and
      querying, for each media experiment in the stored media experiment dataset, the performance data for a period comprising the media experiment to generate the impact data, wherein the impact data is associated with each media experiment;
   generating a mixed model comprising a statistical model including fixed effects and random effects, the mixed model comprising the impact data and the media experiment dataset; and
   providing the mixed model as input to a machine learning algorithm comprising a random forest algorithm to train the machine learning algorithm to determine insights associated with the media mentions and the performance data.

2. The method of claim 1, wherein the standardized query comprises one or more root words, one or more synonyms, and a target, and wherein the root words and synonyms are not changed between queries.

3. The method of claim 1, wherein the validity assessment comprises classifying each result based on whether the media mention associated with the result was a paid advertisement, and if so, determining that the result is invalid.

4. The method of claim 1, wherein the impact variable comprises at least one of: quantity of sales, quantity of customers, or number of transactions.

5. The method of claim 1, wherein the period comprising the media experiment comprises performance data from six hours prior to, and six hours following the media experiment.

6. The method of claim 1, wherein the return is a numerical score associated with an estimated efficacy of the at least one media experiment.

7. The method of claim 1, comprising:
   determining, from the mixed model and for at least one media experiment in the media experiment dataset, an insight associated with the at least one media experiment, wherein the insight comprises at least one of estimated market saturation levels, a score associated with the identified category of media mentions, or predicted future efficacy of the identified category of media mentions.

8. The method of claim 1, wherein storing the media experiment dataset as structured data in the data management system comprises:
   encrypting the media experiment dataset using an encryption algorithm; and
   storing the media experiment dataset as an encrypted matrix.

9. A non-transitory computer-readable storage medium coupled to one or more processors and having instructions stored thereon which, when executed by the one or more processors, cause the one or more processors to perform operations comprising:
   generating a media experiment dataset by:
      identifying, at a data management system controlling one or more media sensors, a category of media mentions to analyze;

performing, by the one or more media sensors, a standardized query of a plurality of media sources for results associated with media mentions in the identified category;

performing, by the data management system, a validity assessment of the results;

associating, by the data management system, each result with geographic reach information; and adding, by the data management system, each result as a new media experiment to a historical dataset comprising previously acquired media experiments from the standardized query to generate the media experiment dataset;

storing the media experiment dataset as structured data in the data management system;

generating impact data by:
identifying an impact variable to be analyzed;
retrieving performance data associated with the impact variable, wherein the performance data is associated with date, time, and a geographic region; and
querying, for each media experiment in the stored media experiment dataset, the performance data for a period comprising the media experiment to generate the impact data, wherein the impact data is associated with each media experiment;

generating a mixed model comprising a statistical model including fixed effects and random effects, the mixed model comprising the impact data and the media experiment dataset; and providing the mixed model as input to a machine learning algorithm comprising a random forest algorithm to train the machine learning algorithm to determine insights associated with the media mentions and the performance data.

10. The medium of claim 9, wherein the standardized query comprises one or more root words, one or more synonyms, and a target, and wherein the root words and synonyms are not changed between queries.

11. The medium of claim 9, wherein the validity assessment comprises classifying each result based on whether the media mention associated with the result was a paid advertisement, and if so, determining that the result is invalid.

12. The medium of claim 9, wherein the impact variable comprises at least one of: quantity of sales, quantity of customers, or number of transactions.

13. The medium of claim 9, wherein the period comprising the media experiment comprises performance data from six hours prior to, and six hours following the media experiment.

14. The medium of claim 9, wherein the return is a numerical score associated with an estimated efficacy of the at least one media experiment.

15. The medium of claim 2, the operations comprising:
determining, from the mixed model and for at least one media experiment in the media experiment dataset, an insight associated with the at least one media experiment, wherein the insight comprises at least one of estimated market saturation levels, a score associated with the identified category of media mentions, or predicted future efficacy of the identified category of media mentions.

16. The medium of claim 9, wherein storing the media experiment dataset as structured data in the data management system comprises:

encrypting the media experiment dataset using an encryption algorithm; and
storing the media experiment dataset as an encrypted matrix.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

generating a media experiment dataset by:
identifying, at a data management system controlling one or more media sensors, a category of media mentions to analyze;
performing, by the one or more media sensors, a standardized query of a plurality of media sources for results associated with media mentions in the identified category;
performing, by the data management system, a validity assessment of the results;
associating, by the data management system, each result with geographic reach information; and
adding, by the data management system, each result as a new media experiment to a historical dataset comprising previously acquired media experiments from the standardized query to generate the media experiment dataset;
storing the media experiment dataset as structured data in the data management system;

generating impact data by:
identifying an impact variable to be analyzed;
retrieving performance data associated with the impact variable, wherein the performance data is associated with date, time, and a geographic region; and
querying, for each media experiment in the stored media experiment dataset, the performance data for a period comprising the media experiment to generate the impact data, wherein the impact data is associated with each media experiment;

generating a mixed model comprising a statistical model including fixed effects and random effects, the mixed model comprising the impact data and the media experiment dataset; and providing the mixed model as input to a machine learning algorithm comprising a random forest algorithm to train the machine learning algorithm to determine insights associated with the media mentions and the performance data.

18. The system of claim 17, wherein the standardized query comprises one or more root words, one or more synonyms, and a target, and wherein the root words and synonyms are not changed between queries.

19. The system of claim 17, wherein the validity assessment comprises classifying each result based on whether the media mention associated with the result was a paid advertisement, and if so, determining that the result is invalid.

20. The system of claim 17, wherein the impact variable comprises at least one of: quantity of sales, quantity of customers, or number of transactions.

* * * * *